US012536977B2

(12) United States Patent
Dou et al.

(10) Patent No.: US 12,536,977 B2
(45) Date of Patent: Jan. 27, 2026

(54) BRIGHTNESS CONTROL METHOD AND APPARATUS FOR DISPLAY PANEL

(71) Applicants: Beijing BOE Display Technology Co., Ltd., Beijing (CN); BOE Technology Group Co., Ltd., Beijing (CN)

(72) Inventors: Shuqian Dou, Beijing (CN); Hao Wu, Beijing (CN); Xiaofeng Yin, Beijing (CN); Jian Ren, Beijing (CN); Xiaoping Zhang, Beijing (CN); Litao Fan, Beijing (CN); Shengwei Yang, Beijing (CN); Xiaojuan Gao, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/622,778

(22) Filed: Mar. 29, 2024

(65) Prior Publication Data

US 2024/0242695 A1 Jul. 18, 2024

Related U.S. Application Data

(63) Continuation of application No. PCT/CN2022/110570, filed on Aug. 5, 2022.

(51) Int. Cl.
*G09G 5/10* (2006.01)

(52) U.S. Cl.
CPC ........... *G09G 5/10* (2013.01); *G09G 2310/08* (2013.01); *G09G 2320/0626* (2013.01); *G09G 2330/021* (2013.01); *G09G 2360/144* (2013.01)

(58) Field of Classification Search
None
See application file for complete search history.

(56) References Cited

U.S. PATENT DOCUMENTS

2005/0082968 A1 4/2005 Choi et al.
2007/0046619 A1* 3/2007 Sano .................... G09G 3/3406 345/102

(Continued)

FOREIGN PATENT DOCUMENTS

CN 209070955 U 7/2019
CN 111445869 A 7/2020

(Continued)

*Primary Examiner* — Amr A Awad
*Assistant Examiner* — Donna V Bocar
(74) *Attorney, Agent, or Firm* — IPro, PLLC

(57) ABSTRACT

Provided are a brightness control method and apparatus for a display panel. The brightness control method includes: loading a measurement pulse-signal to a source of a first thin film transistor of a brightness measurement module in a display panel and a source of a second thin film transistor of a reference module, loading an adjustment control-signal to a gate of the first and second thin film transistors, the adjustment control-signal is a fixed voltage signal, the range of a voltage difference between the adjustment control-signal and a drain of the second thin film transistor is −2V-2V, the voltage range of an active level of the measurement pulse-signal is 3V-14V; detecting a brightness measurement signal output by the brightness measurement module, detecting a reference signal output by the reference module; adjusting the brightness of the display panel by means of detected brightness measurement signal and reference signal.

18 Claims, 9 Drawing Sheets

(56) References Cited

U.S. PATENT DOCUMENTS

| | | | | |
|---|---|---|---|---|
| 2007/0273778 | A1* | 11/2007 | Hsu | H04N 17/02 345/87 |
| 2009/0261738 | A1* | 10/2009 | Hsu | G01J 1/4204 315/158 |

FOREIGN PATENT DOCUMENTS

| | | | |
|---|---|---|---|
| CN | 112071274 | A | 12/2020 |
| CN | 214253696 | U | 9/2021 |
| CN | 114299823 | A | 4/2022 |
| CN | 114582294 | A | 6/2022 |
| CN | 114822388 | A | 7/2022 |

* cited by examiner

BRIGHTNESS CONTROL METHOD AND APPARATUS FOR DISPLAY PANEL

CROSS-REFERENCE TO RELATED APPLICATIONS

This disclosure is a continuation of International Application No. PCT/CN2022/110570, filed on Aug. 5, 2022, which is hereby incorporated by reference in its entirety.

TECHNICAL FIELD

The present disclosure relates to the field of display technology, and in particular to a brightness control method and device for a display panel.

BACKGROUND

With the development of the display technology field, the display device has added the ambient light function of the whole machine, which is used to adjust the display brightness of the display device under different ambient brightness, ensuring that the brightness of the display screen meets the normal use of the user, while the power consumption of the display device is saved.

In the related art, an ambient light sensor is provided on the display device for detecting the brightness of the ambient light. The display device can adjust the display brightness of the display device according to the detected brightness change of the ambient light. However, the use of ambient light sensors also increases the manufacturing cost of the display device accordingly.

SUMMARY

Embodiments of the present disclosure provide a brightness control method for a display panel, the display panel includes: a brightness detection module and a reference module, the brightness detection module includes a plurality of first thin film transistors connected in parallel and the first thin film transistors are configured to receive ambient light; the reference module includes a plurality of second thin film transistors connected in parallel and the second thin film transistors are configured to be in a dark environment; and the brightness control method includes:

- loading a detection pulse signal respectively to a source of the first thin film transistor of the brightness detection module and a source of the second thin film transistor of the reference module in the display panel, and loading an adjustment control signal to a gate of the first thin film transistor and a gate of the second thin film transistor; the adjustment control signal is a fixed voltage signal, and a range of a voltage difference between the adjustment control signal and a drain of the second thin film transistor is −2V~2V, and a voltage range of an effective level of the detection pulse signal is 3V~14V;
- detecting a brightness detection signal output by the brightness detection module and detecting a reference signal output by the reference module; and
- adjusting brightness of the display panel through the detected and obtained brightness detection signal and reference signal.

In some possible implementations, a frequency of the detection pulse signal is less than a frequency of the ambient light, and a duration of the effective level of the detection pulse signal is not less than a duration of one cycle of the ambient light.

In some possible implementations, the duration of the effective level of the detection pulse signal is an integer multiple of the duration of one cycle of the ambient light.

In some possible implementations, the frequency of the ambient light is one of 50 Hz and 60 Hz; and

- the frequency of the detection pulse signal is one of 10 Hz, 5 Hz, 2 Hz and 1 Hz.

In some possible implementations, the frequency of the ambient light is 60 Hz, and the frequency of the detection pulse signal is 10 Hz; and

- a duty cycle of the detection pulse signal ranges from 16.6% to 66.6%.

In some possible implementations, the duty cycle of the detection pulse signal is one of 16.6%, 33.3%, 50% and 66.6%.

In some possible implementations, the frequency of the ambient light is 50 Hz, and the frequency of the detection pulse signal is 10 Hz; and

- the duty cycle of the detection pulse signal ranges from 20% to 80%.

In some possible implementations, the duty cycle of the detection pulse signal is one of 20%, 40%, 60% and 80%.

In some possible implementations, a voltage of the adjustment control signal loaded on the gate of the first thin film transistor is 0 V; and a voltage of the adjustment control signal loaded on the gate of the second thin film transistor is 0 V.

In some possible implementations, the gate of the first thin film transistor and the gate of the second thin film transistor are coupled to a ground terminal.

In some possible implementations, the detecting the brightness detection signal output by the brightness detection module and detecting the reference signal output by the reference module, includes:

- within a maintenance duration of the effective level of the detection pulse signal, detecting the brightness detection signal output by the brightness detection module multiple times and detecting the reference signal output by the reference module multiple times.

In some possible implementations, the adjusting the brightness of the display panel through the detected and obtained brightness detection signal and reference signal, includes:

- determining a detection voltage average value of the brightness detection signal obtained by detecting multiple times, and determining a reference average value of the reference signal obtained by detecting multiple times; and
- adjusting the brightness of the display panel according to a difference between the determined detection voltage average value and the determined reference average value.

Embodiments of the present disclosure provide a brightness control device for a display panel, the display panel includes: a brightness detection module and a reference module, the brightness detection module includes a plurality of first thin film transistors connected in parallel and the first thin film transistors are configured to receive ambient light; the reference module includes a plurality of second thin film transistors connected in parallel and the second thin film transistors are configured to be in a dark environment; and the brightness control device includes:

- a signal loading circuit, configured to respectively load a detection pulse signal to a source of the first thin film transistor of the brightness detection module and a source of the second thin film transistor of the reference module in the display panel, and load an adjustment control signal to a gate of the first thin film transistor and the gate of the second thin film transistor; the adjustment control signal is a fixed voltage signal, and a range of a voltage difference between the adjustment control signal and a drain of the second thin film transistor is −2V~2V, and a voltage range of an effective level of the detection pulse signal is 3V~14V;

a signal detection circuit, configured to detect the brightness detection signal output by the brightness detection module and detect the reference signal output by the reference module within a maintenance duration of an effective level of the detection pulse signal; and a brightness adjustment circuit, configured to adjust brightness of the display panel through the detected and obtained brightness detection signal and reference signal.

Embodiments of the present disclosure provide a display device, including: a display panel and a brightness control device;

the display panel includes: a brightness detection module and a reference module, the brightness detection module includes a plurality of first thin film transistors connected in parallel and the first thin film transistors are configured to receive ambient light; and the reference module includes a plurality of second thin film transistors connected in parallel and the second thin film transistors are configured to be in a dark environment; and the brightness control device is the above brightness control device for the display pane.

In some possible implementations, the brightness control device has a first pin, a second pin, a third pin, a fourth pin, a fifth pin and a sixth pin;

the gate of the first thin film transistor is coupled to the first pin of the brightness control device, the source of the first thin film transistor is coupled to the second pin of the brightness control device, a drain of the first thin film transistor is coupled to the third pin of the brightness control device;

the gate of the second thin film transistor is coupled to the fourth pin of the brightness control device, the source of the second thin film transistor is coupled to the fifth pin of the brightness control device, and the drain of the second thin film transistor is coupled to the sixth pin of the brightness control device.

In some possible implementations, the brightness control device further includes a first divider resistance and a second divider resistance;

a first end of the first divider resistance is coupled to the third pin, and a second end of the first divider resistance is coupled to a ground terminal;

a first end of the second divider resistance is coupled to the sixth pin, and a second end of the second divider resistance is coupled to the ground terminal.

In some possible implementations, the gate of the first thin film transistor is coupled to the ground terminal; and the gate of the second thin film transistor is coupled to the ground terminal.

In some possible implementations, the first pin and the fourth pin are the same pin, and the second pin and the fifth pin are the same pin.

In some possible implementations, the display panel further includes a black matrix;

the black matrix corresponding to the first thin film transistor has an opening; and the second thin film transistor is blocked by the black matrix.

DETAILED DESCRIPTION

Figure 1:
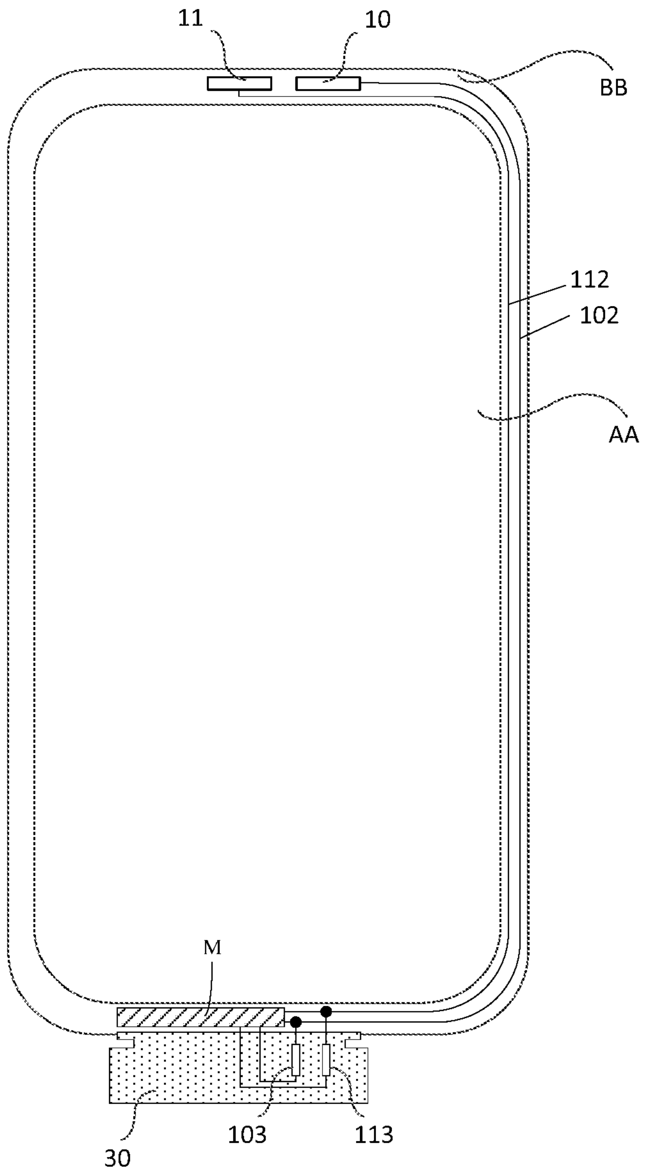
FIG. 1 is a schematic structural diagram of a display panel in an embodiment of the present disclosure.

In order to make the purpose, technical solutions and advantages of the embodiments of the present disclosure more clear, the technical solutions of the embodiments of the present disclosure will be clearly and completely described below in conjunction with the drawings of the embodiments of the present disclosure. Obviously, the described embodiments are some, but not all, of the embodiments of the present disclosure. And the embodiments and features in the embodiments of the present disclosure may be combined with each other without conflict. Based on the described embodiments of the present disclosure, all other embodiments obtained by those of ordinary skill in the art without creative efforts fall within the scope of protection of the present disclosure.

Unless otherwise defined, technical terms or scientific terms used in this disclosure shall have the usual meaning understood by a person with ordinary skill in the art to which this disclosure belongs. "First", "second" and similar words used in this disclosure do not indicate any order, quantity or importance, but are only used to distinguish different components. Words such as "include" or "comprise" mean that the elements or things appearing before the word include the elements or things listed after the word and their equivalents, without excluding other elements or things. Words such as "connected" or "connection" are not limited to physical or mechanical connections, but may include electrical connections, whether direct or indirect.

It should be noted that the size and shape of each figure in the drawings do not reflect the true proportions, and are only intended to illustrate the content of the present disclosure. And the same or similar reference numbers throughout represent the same or similar elements or elements with the same or similar functions.

As shown in FIG. 1, a display panel provided by an embodiment of the present disclosure includes: a display area AA and a peripheral area BB located on at least one side of the display area AA. For example, as shown in FIG. 1, the peripheral area BB may be arranged around the display area AA.

Figure 2:
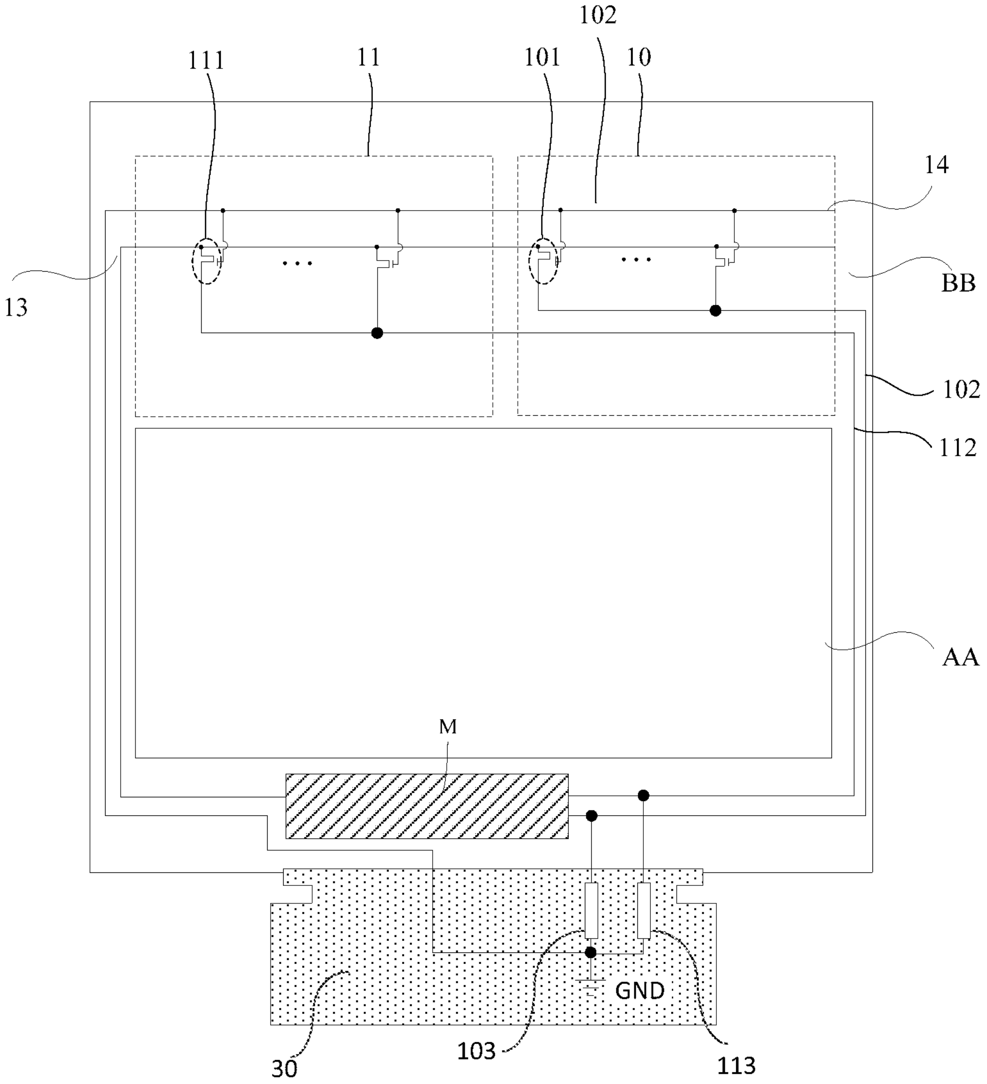
FIG. 2 is another schematic structural diagram of a display panel in an embodiment of the present disclosure.

In some embodiments of the present disclosure, as shown in FIGS. 1 and 2, the display panel includes a brightness detection module 11 and a reference module 10. Exemplarily, as shown in FIGS. 1 and 2, the brightness detection module 11 is arranged in the peripheral area BB, and a black matrix is arranged at a color filter, CF position corresponding to the brightness detection module, and the corresponding black matrix has an opening for sensing ambient light from the outside. The brightness detection module 11 includes a plurality of first thin film transistors 111 connected in parallel. Among the plurality of first thin film transistors 111 included in the brightness detection module 11, sources of the plurality of first thin film transistors 111 are configured to load a detection pulse signal, and gates of the plurality of first thin film transistors 111 are configured to load an adjustment control signal. Furthermore, among the plurality of first thin film transistors 111 included in the brightness detection module 11, the material of active layers of the plurality of first thin film transistors 111 includes a photosensitive material, so that the first thin film transistors 111 can generate a photo-generated current signal when exposed to ambient light. The brightness detection signal of the ambient light includes the photo-generated current signal.

It should be noted that the intensity of the ambient light received by the active layer is different, and the magnitude of the photo-generated current signal generated by the first thin film transistor 111 is different, so that the magnitude of the brightness detection signal of the ambient light is different. That is, the larger the photo-generated current signal generated by the first thin film transistor 111 is, the larger the brightness detection signal of the ambient light is.

In some embodiments of the present disclosure, as shown in FIGS. 1 and 2, the reference module 10 is provided in the peripheral area BB, and a black matrix is provided at a CF position corresponding to the reference module to block external ambient light. The reference module 10 includes a plurality of second thin film transistors 101 connected in parallel. The reference module 10 is configured to generate and output a reference signal through the second thin film transistors 101 in a dark state without ambient light.

It should be noted that, among the plurality of second thin film transistors 101 included in the reference module 10, sources of the plurality of second thin film transistors 101 are configured to load a detection pulse signal, and gates of the plurality of second thin film transistors 101 are configured to load an adjustment control signal. When the reference module 10 is in the dark state without ambient light, the leakage current flowing through at least one second thin film transistor 101 included in the reference module 10 is the reference signal.

In the embodiments of the present disclosure, in the peripheral area BB of the display panel, the plurality of first thin film transistors 111 connected in parallel are used to form the brightness detection module 11, and the plurality of second thin film transistors 101 connected in parallel are used to form the reference module 10. The brightness detection module 11 receives the irradiation of ambient light and generates and outputs the brightness detection signal, so that the reference module 10 is in the dark state without ambient light and generates and outputs the reference signal. In this way, the actual brightness of the ambient light can be obtained based on the brightness detection signal and the reference signal. Since thin film transistors are used to form the brightness detection module 11 and the reference module 10, the brightness detection module 11 and the reference module 10 can be formed in the same process as the thin film transistors used to form pixel circuits in the display panel 100, without the need to separately purchase an ambient light sensor, thereby saving the production cost of the display device.

Moreover, due to the characteristics of the thin film transistor itself, some characteristics will change during operation. The most obvious one is that leakage current will occur during operation. Therefore, the brightness detection current signal output by the brightness detection module 11 includes, in addition to the photo-generated current signal generated by each first thin film transistor 111 in the brightness detection module 11 when exposed to light, the leakage current generated by each first thin film transistor 111. The first thin film transistor 111 and the second thin film transistor 101 can be configured as transistors with the same structure and the same material used in the film layer, in this way, the reference module 10 can be used as a reference, and the reference signal output by the reference module 10 can actually represent the leakage current generated by each first thin film transistor, so that the brightness detection module 11 is compared with the reference module 10, the leakage current (reference signal) of the brightness detection module 11 in the dark state without ambient light is removed from the brightness detection signal to obtain the photo-generated current signal generated by the brightness detection module 11 when simply exposed to ambient light, and the actual brightness of the ambient light can be obtained according to the photo-generated current signal, which is beneficial to improving the detection accuracy of the brightness detection module 11. Therefore, by detecting the brightness detection signal output by the brightness detection module 11 multiple times and detecting the reference signal output by the reference module 10 multiple times, the brightness of the display panel is adjusted.

Figure 3:
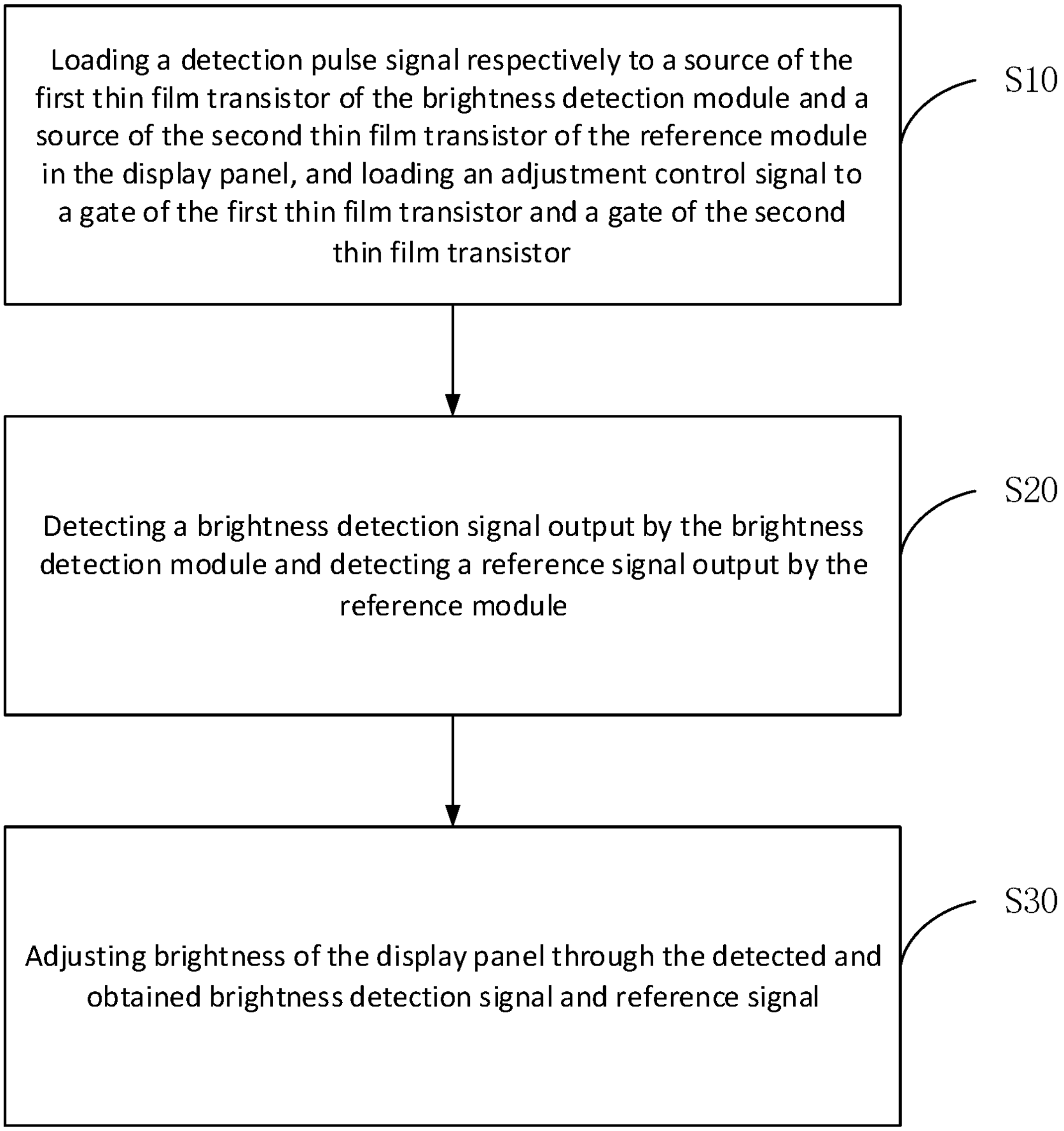
FIG. 3 is a flow chart of a brightness control method for a display panel in an embodiment of the present disclosure.

Embodiments of the present disclosure provide a brightness control method for the above-mentioned display panel, as shown in FIG. 3, including:

S10: loading a detection pulse signal respectively to a source of the first thin film transistor 111 of the brightness detection module and a source of the second thin film transistor 101 of the reference module in the display panel, and loading an adjustment control signal to a gate of the first thin film transistor 111 and a gate of the second thin film transistor 101.

Exemplarily, the reference module 10 includes a plurality of second thin film transistors 101, sources of the plurality of second thin film transistors 101 are configured to load detection pulse signals, and gates of the plurality of second thin film transistors 101 are configured to load adjustment control signals. When the reference module 10 is in the dark state without ambient light, the leakage current flowing through at least one second thin film transistor 101 included in the reference module 10 is the reference signal.

Exemplarily, the brightness detection module 11 includes a plurality of first thin film transistors 111, the sources of the plurality of first thin film transistors 111 are configured to load detection pulse signals, and the gates of the plurality of first thin film transistors 111 are configured to load adjustment control signals. Since the materials of the active layers of the plurality of first thin film transistors 111 include a photosensitive material, the first thin film transistors 111 can generate a photo-generated current signal by receiving the irradiation of ambient light. The brightness detection signal of the ambient light includes the photo-generated current signal and the leakage current the first thin film transistor 111.

In the embodiments of the present disclosure, the adjustment control signal loaded on the gates of the first thin film transistor 111 and the second thin film transistor 101 is a fixed voltage signal, and a range of a voltage difference between the adjustment control signal and a drain of the second thin film transistor 101 is −2V~2V. A voltage range of an effective level of the detection pulse signal loaded on the sources of the first thin film transistor 111 and the second thin film transistor 101 is 3V to 14V. Since in actual work, the characteristics of the first thin film transistor 111 will change due to pressure during operation, which will affect the leakage current generated by the first thin film transistor 111, causing the leakage current to change, thereby affecting the stability of the brightness detection signal of the ambient light, to further affect the stability of photoelectric detection, and affect the stability of the brightness adjustment of the display panel.

The brightness control method provided by the embodiments of the present disclosure sets the adjustment control signal loaded on the gates of the first thin film transistor 111 and the second thin film transistor 101 as a fixed voltage signal, and controls the range of the voltage difference between the adjustment control signal and the drain of the second thin film transistor 101 to be −2V to 2V, which can reduce the leakage current of the first thin film transistor 111 and the second thin film transistor 101 in the dark state to a lower level. In this way, the proportion of the leakage current in the dark state in the brightness detection signal can be reduced as much as possible, and the impact of the characteristic change of the first thin film transistor 111 on the brightness detection signal can be reduced as much as possible, or even be ignored. Therefore, this setting can achieve a state where the leakage current generated in the dark state when the thin film transistor is working has minimal impact on the detection results and can basically be ignored, thereby achieving the stability and accuracy of the detection results, thereby improving the stability and accuracy of the brightness adjustment of the display panel.

In some embodiments of the present disclosure, the ambient light is light emitted by an illumination light source that appears in the usage environment of the display panel. For example, the illumination light source is a light lamp. Typically, light lamp is powered by alternating current.

However, the power frequency of the alternating current is 50 Hz and 60 Hz. The ambient light source uses mains power, so there are two conditions for the frequency of ambient light, that is, the ambient light is 50 Hz or 60 Hz. Since the mains power may be unstable, the ambient light source will flicker with the frequency of the mains power. That is, the ambient light will cause flicker problems. The flicker of the ambient light will affect the detected brightness detection signal, so the detection data will be inaccurate. In the embodiments of the present disclosure, the frequency of the detection pulse signal is set to be less than the frequency of the ambient light, and the duration of the effective level of the detection pulse signal is set to no less than the duration of one cycle of the ambient light, so that the ambient light is detected in the flicker cycle of the ambient light, which is beneficial to improving the accuracy of the detection data of the brightness detection module 11.

For example, the duration of the effective level of the detection pulse signal is an integer multiple of the duration of one cycle of the ambient light. For example, the duration of the effective level of the detected pulse signal is 1, 2, 3 or more times the duration of one cycle of the ambient light, which is not limited here.

For example, the frequency of the ambient light can be one of 50 Hz and 60 Hz, and the frequency of the detection pulse signal can also be one of 10 Hz, 5 Hz, 2 Hz and 1 Hz.

Figure 4:
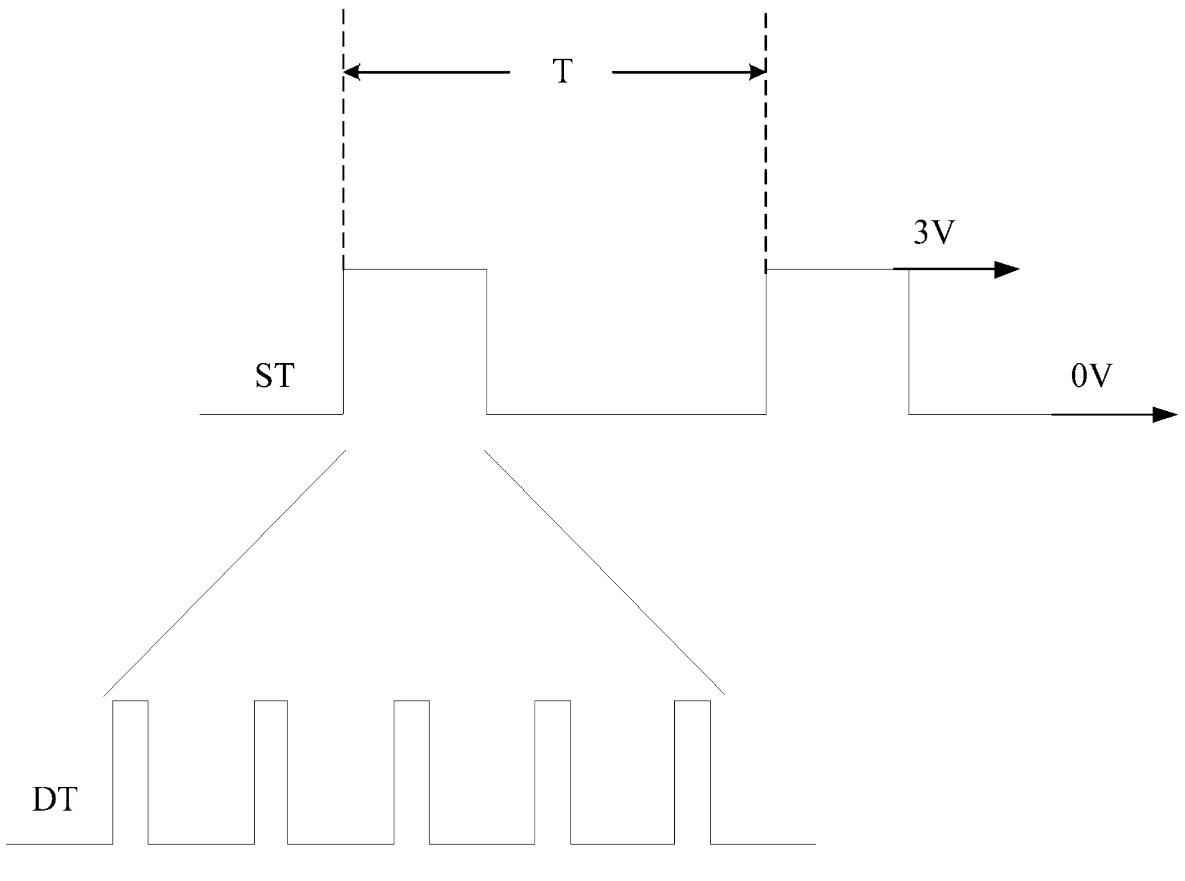
FIG. 4 is some signal timing diagrams in embodiments of the present disclosure.

As shown in FIG. 4, the detection pulse signal loaded on the sources of the first thin film transistor 111 and the second thin film transistor 101 is a square wave with alternating high and low levels. The effective level of the detection pulse signal is a high level, and the ineffective level is a low level. In the embodiments of the present disclosure, the duty cycle of the detection pulse signal ranges from 16.6% to 80%. It should be noted that the duty cycle of the detection pulse signal refers to the ratio of a high-level duration within one cycle T of the detection pulse signal (that is, the sum of a high-level duration and a low-level duration). For example, when the frequency of the ambient light is 60 Hz and the frequency of the detection pulse signal is 10 Hz, the duty cycle of the detection pulse signal may range from 16.6% to 66.6%. Optionally, when the frequency of the ambient light is 60 Hz and the frequency of the detection pulse signal is 10 Hz, the duty cycle of the detection pulse signal may be one of 16.6%, 33.3%, 50% and 66.6%. Of course, in practical applications, when the frequency of the ambient light is 60 Hz, the frequency of the detection pulse signal may be 5 Hz, 2 Hz, or 1 Hz. The duty cycle of the detection pulse signal can be determined according to the needs of the actual application, and is not limited here.

For example, when the frequency of the ambient light is 50 Hz and the frequency of the detection pulse signal is 10 Hz, the duty cycle of the detection pulse signal may range from 20% to 80%. Optionally, when the frequency of the ambient light is 50 Hz and the frequency of the detection pulse signal is 10 Hz, the duty cycle of the detection pulse signal may be one of 20%, 40%, 60% and 80%. Of course, in practical applications, when the frequency of the ambient light is 50 Hz, the frequency of the detection pulse signal may be 5 Hz, 2 Hz, and 1 Hz. The duty cycle of the detection pulse signal can be determined according to the needs of the actual application, and is not limited here.

For example, as shown in FIG. 4, if the frequency of the detection pulse signal is 10 Hz and the duty cycle of the detection pulse signal is 20%, the high-level duration of the detection pulse signal is 20 ms. When the duty cycle of the detection pulse signal is 40%, the high-level duration of the detection pulse signal is 40 ms.

Exemplarily, the high-level voltage of the detection pulse signal loaded on the sources of the first thin film transistor 111 and the second thin film transistor 101 is set to one of 3V, 5V, and 10V. For example, as shown in FIG. 4, the high-level voltage of the detection pulse signal is 3V.

In the embodiments of the present disclosure, the brightness detection module 11 includes a plurality of first thin film transistors 111, and the gates of the plurality of first thin film transistors 111 are configured to load adjustment control signals; the reference module 10 includes a plurality of second thin film transistors 101, the gates of the plurality of second thin film transistors 101 are configured to load adjustment control signals. The voltage of the adjustment control signal applied to the gate of the first thin film transistor 111 is 0V, and the voltage of the adjustment control signal applied to the gate of the second thin film transistor 101 is 0V. This can minimize the leakage current generated by the first thin film transistor 111 and the second thin film transistor 101, further reduce the impact on the brightness detection signal, and further improve the accuracy of detection.

For example, in order to make the voltage of the adjustment control signal be 0V, the gates of the first thin film transistor 111 and the second thin film transistor 101 are coupled to the ground terminal.

S20: detecting a brightness detection signal output by the brightness detection module and detecting a reference signal output by the reference module.

Here, the detecting the brightness detection signal output by the brightness detection module and detecting the reference signal output by the reference module, includes: within a maintenance duration of the effective level of the detection pulse signal, detecting the brightness detection signal output by the brightness detection module multiple times and detecting the reference signal output by the reference module multiple times. Exemplarily, as shown in FIG. 4, the signal ST represents the timing of the detection pulse signal provided to the source of the first thin film transistor 111 or the second thin film transistor 101, and the signal DT represents the timing when the drain of the first thin film transistor 111 or the second thin film transistor 101 is detected, among which, when the high level of the signal DT appears, the detection will be performed once. Within a maintenance duration of a high level of the detection pulse signal ST, high levels of multiple signals DT appear. In this way, the process of detecting the signal of the drain of the first thin film transistor 111 or the second thin film transistor 101 multiple times can be realized within the maintenance duration of the high level of the detection pulse signal ST.

S30: adjusting brightness of the display panel through the detected and obtained brightness detection signal and reference signal.

In the embodiments of the present disclosure, the adjusting the brightness of the display panel through the detected and obtained brightness detection signal and reference signal, includes: determining a detection voltage average value of the brightness detection signal obtained by detecting multiple times, and determining a reference average value of the reference signal obtained by detecting multiple times; and adjusting the brightness of the display panel according to a difference between the determined detection voltage average value and the determined reference average value.

Figure 5:
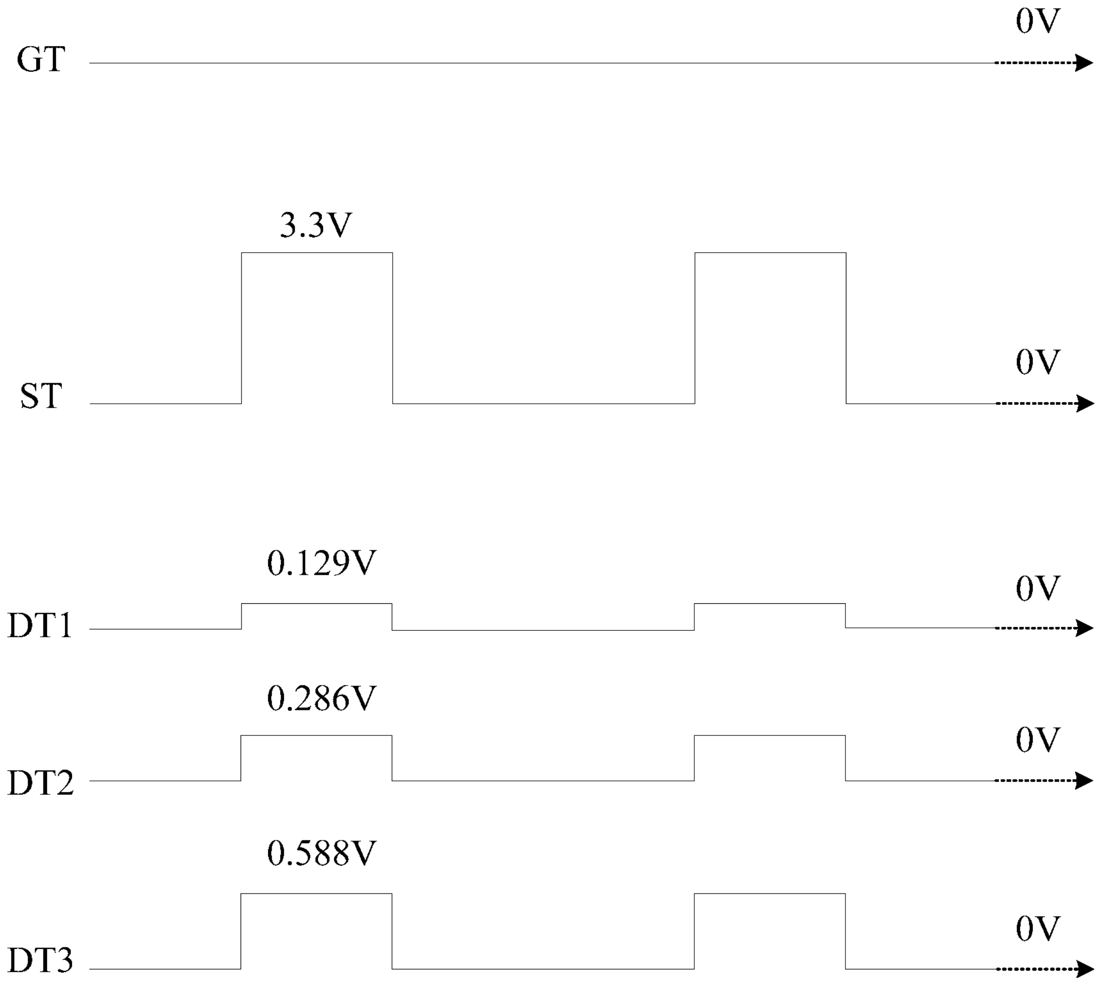
FIG. 5 is another signal timing diagram in an embodiment of the present disclosure.

The brightness control method provided by the embodiments of the present disclosure will be described below with reference to specific embodiments and FIG. 5.

In some examples, the high-level voltage of the detection pulse signal ST loaded on the sources of the plurality of first thin film transistors 111 in the brightness detection module 11 and the plurality of second thin film transistors 101 in the reference module 10 is set to 3.3 V, the duty cycle of the detection pulse signal ST is 40%. And the voltage of the adjustment control signal GT loaded on the gate of the first thin film transistor 111 and the voltage of the adjustment control signal GT loaded on the gate of the second thin film transistor 101 are 0V.

During the maintenance duration of the high level of the detection pulse signal ST, the reference signal DT1 of the drain of the second thin film transistor 101 is detected multiple times, and the voltage of the detected and obtained reference signal DT1 is 0.129V, that is, when the ambient illumination is set to 0 lux, the voltage output from the drain of the second thin film transistor 101 is 0.129V.

During the maintenance duration of the high level of the detection pulse signal ST, when the ambient illumination is set to 60 lux, the brightness detection signal DT2 of the drain of the first thin film transistor 111 is detected multiple times, and the voltage of the detected and obtained brightness detection signal DT2 is 0.286V, that is, when the ambient illumination is set to 60 lux, the voltage output from the drain of the first thin film transistor 111 is 0.286V.

The reference average value corresponding to the voltage 0.129V of the reference signal DT1 detected multiple times is determined, and the reference average value is 0.129V. And the detection voltage average value corresponding to the voltage 0.286V of the brightness detection signal DT2 detected multiple times is determined, and the detection voltage average value is 0.286V.

The brightness of the display panel is adjusted according to the determined detection voltage average value and the determined reference average value.

In some other examples, the high-level voltage of the detection pulse signal ST loaded on the sources of the plurality of first thin film transistors 111 in the brightness detection module 11 and the plurality of second thin film transistors 101 in the reference module 10 is set to 3.3V, the duty cycle of the detection pulse signal ST is 40%. And the voltage of the adjustment control signal GT loaded on the gate of the first thin film transistor 111 and the voltage of the adjustment control signal GT loaded on the gate of the second thin film transistor 101 are 0V.

During the maintenance duration of the high level of the detection pulse signal ST, the reference signal DT1 of the drain of the second thin film transistor 101 is detected multiple times, and the voltage of the detected and obtained reference signal DT1 is 0.129V, that is, when the ambient illumination is set to 0 lux, the voltage output from the drain of the second thin film transistor 101 is 0.129V.

During the maintenance duration of the high level of the detection pulse signal ST, when the ambient illumination is set to 300 lux, the brightness detection signal DT3 of the drain of the first thin film transistor 111 is detected multiple times, and the voltage of the detected and obtained brightness detection signal DT3 is 0.588V. That is, when the ambient illumination is set to 300 lux, the voltage output from the drain of the first thin film transistor 111 is 0.588V.

The reference average value corresponding to the voltage 0.129V of the reference signal DT1 detected multiple times is determined, and the reference average value is 0.129V. And the detection voltage average value corresponding to the voltage 0.588V of the brightness detection signal DT3 detected multiple times is determined, and the detection voltage average value is 0.588V.

The brightness of the display panel is adjusted according to the determined detection voltage average value and the determined reference average value.

It should be noted that in a dark environment with 60 lux illumination, the photo-generated current corresponding to the voltage of 0.286V of the brightness detection signal DT2 is basically equivalent to the leakage current in the dark state, that is, the fluctuation of the leakage current in the dark state is less than 3%, of which influence to the photo-generated current is less than 3%, that is, the influence of the fluctuation of the leakage current on the photo-generated current in the dark state is within the error acceptance range of ±15%. Moreover, as the ambient illumination increases, for example, in a 300 lux illumination environment, the photo-generated current is much larger than the leakage current in the dark state. Therefore, the change in leakage current in the dark state affected by changes in transistor characteristics has a basically negligible impact on the photo-generated current, which ultimately improves the stability and accuracy of detection, thereby improving the accuracy of brightness adjustment.

Figure 6:
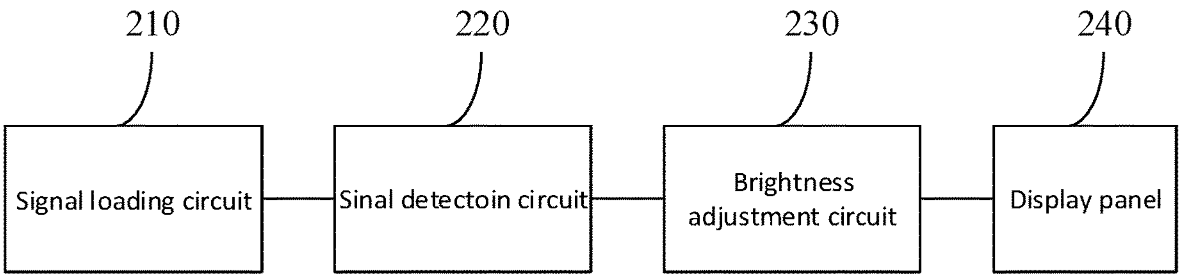
FIG. 6 is a schematic structural diagram of a brightness control device in an embodiment of the present disclosure.

Embodiments of the present disclosure further provide a brightness control device. As shown in FIG. 6, the brightness control device includes:

- a signal loading circuit 210, configured to respectively load a detection pulse signal on a source of the first thin film transistor 111 of the brightness detection module and a source of the second thin film transistor 101 of the reference module in the display panel, and load an adjustment control signal to a gate of the first thin film transistor 111 and a gate of the second thin film transistor 101; the adjustment control signal is a fixed voltage signal, and a range of a voltage difference between the adjustment control signal and a drain of the second thin film transistor is −2V~2V, and a voltage range of an effective level of the detection pulse signal is 3V~14V;
- a signal detection circuit 220, configured to detect the brightness detection signal output by the brightness detection module and detect the reference signal output by the reference module within a maintenance duration of an effective level of the detection pulse signal; and
- a brightness adjustment circuit 230, configured to adjust brightness of the display panel 240 through the detected and obtained brightness detection signal and reference signal.

In the embodiments of the present disclosure, the signal loading circuit, the signal detection circuit, and the brightness adjustment circuit may be in the form of a complete hardware embodiment, a complete software embodiment, or an embodiment that combines software and hardware aspects, which are not limited here.

It should be noted that the working principle and specific implementation of the brightness control device are the same as the principles and implementation of the brightness control method in the above embodiments. Therefore, the working method of the brightness control device can be implemented by referring to the specific implementation of the brightness control method in the above embodiments, and will not be repeated herein.

Embodiments of the present disclosure further provide a display device, as shown in FIGS. 1 and 2, including: a display panel and the above-mentioned brightness control device M provided by the embodiments of the present disclosure. The brightness control device M is coupled to the first thin film transistor 111 and the second thin film transistor 101.

In a specific embodiment, the brightness control device M has a first pin, a second pin, a third pin, a fourth pin, a fifth pin and a sixth pin. The gate of the first thin film transistor 111 is coupled to the first pin of the brightness control device M, the source electrode of the first thin film transistor 111 is coupled to the second pin of the brightness control device M, and the drain of the first thin film transistor 111 is coupled to the third pin of the brightness control device M, and the gate of the second thin film transistor 101 is coupled to the fourth pin of the brightness control device M, the source of the second thin film transistor 101 is coupled to the fifth pin of the brightness control device M, and the drain of the second thin film transistor 101 is coupled with the sixth pin of the brightness control device M. For example, the first pin and the fourth pin are the same pin, and the second pin and the fifth pin are the same pin, which can save the number of pins used.

Figure 7A:
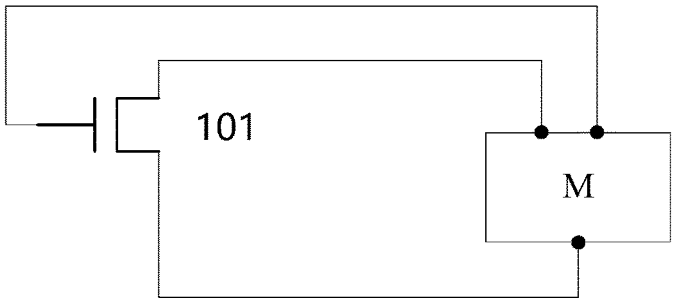
FIG. 7A is a schematic structural diagram of some equivalent circuits in embodiments of the present disclosure.
Figure 7B:
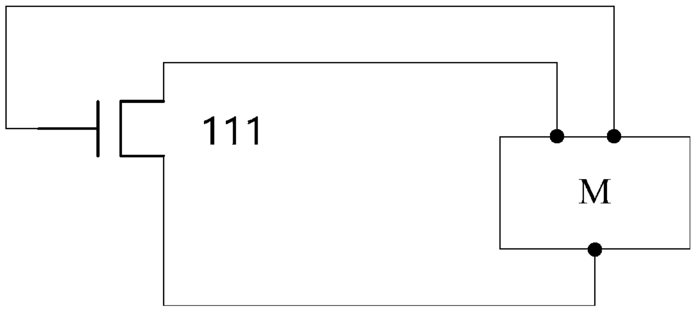
FIG. 7B is a schematic structural diagram of other equivalent circuits in embodiments of the present disclosure.
Figure 8A:
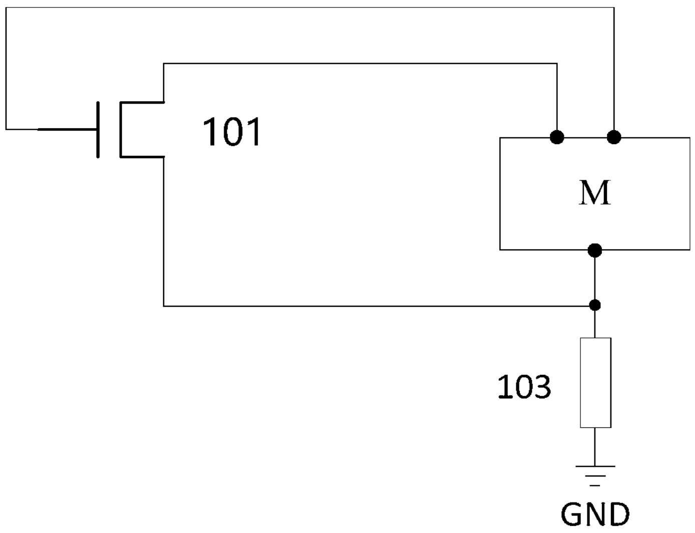
FIG. 8A is a schematic structural diagram of some other equivalent circuits in embodiments of the present disclosure.
Figure 8B:
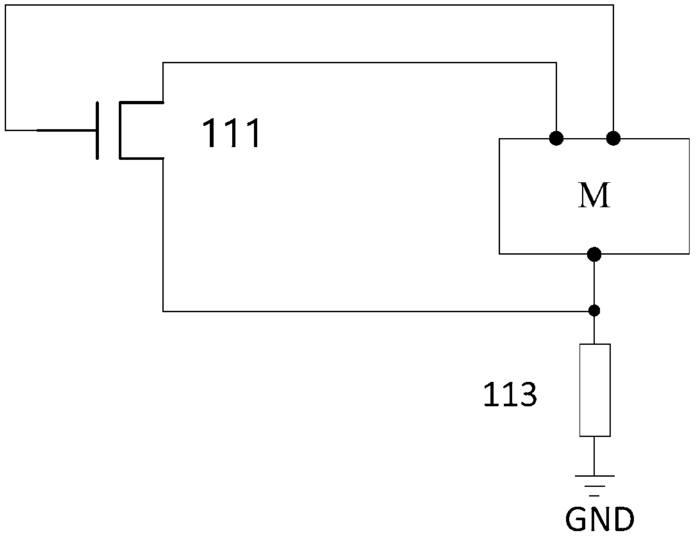
FIG. 8B is a schematic structural diagram of some other equivalent circuits in embodiments of the present disclosure.

Exemplarily, as shown in FIGS. 7A and 7B, the gate of the first thin film transistor 111 is coupled to the first pin of the brightness control device M, the source of the first thin film transistor 111 is coupled to the second pin of the brightness control device M, and the drain of the first thin film transistor 111 is coupled to the third pin of the brightness control device M. The gate of the second thin film transistor 101 is coupled to the fourth pin of the brightness control device M, the source of the second thin film transistor 101 is coupled to the fifth pin of the brightness control device M, and the drain of the second thin film transistor 101 is coupled to the sixth pin of the brightness control device M.

Figure 9A:
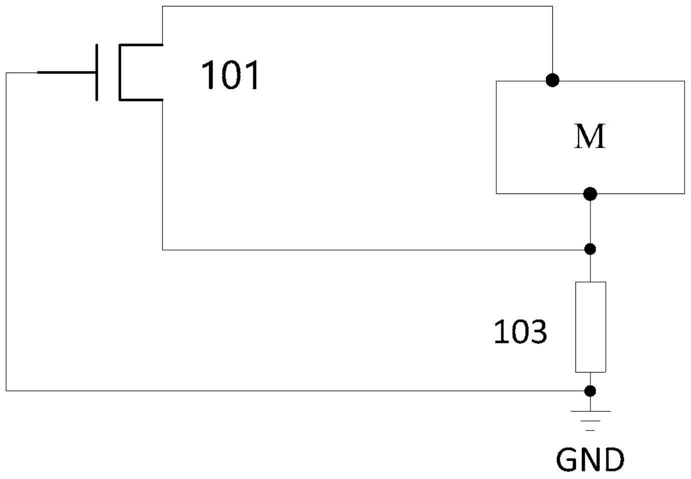
FIG. 9A is a schematic structural diagram of some other equivalent circuits in embodiments of the present disclosure.
Figure 9B:
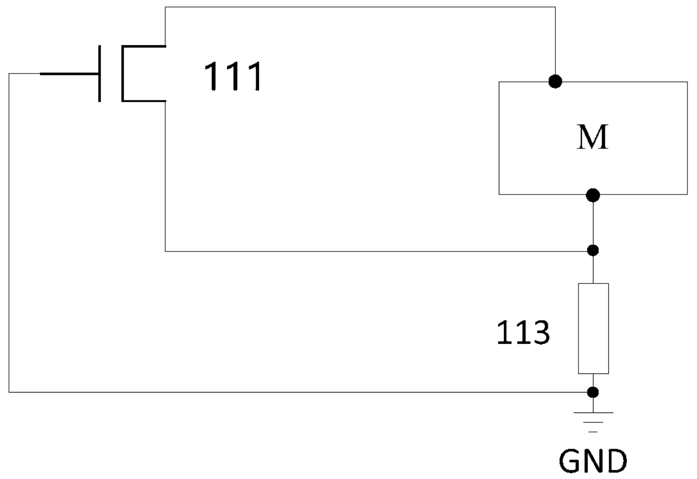
FIG. 9B is a schematic structural diagram of some other equivalent circuits in embodiments of the present disclosure.

Further, for example, as shown in FIGS. 9A and 9B, the gate of the first thin film transistor 111 is coupled to the ground terminal, and the gate of the second thin film transistor 101 is coupled to the ground terminal.

Exemplarily, as shown in FIGS. 8A to 9B, the brightness control device M further includes a first divider resistance 103 and a second divider resistance 113. Wherein, the first end of the first divider resistance 103 is coupled to the third pin, and the second end of the first divider resistance 103 is coupled to the ground terminal. The first end of the second divider resistance 113 is coupled to the sixth pin, and the second end of the second divider resistance 113 is coupled to the ground terminal.

For example, as shown in FIGS. 1 and 2, the display panel further includes a source transmission line 13, a gate transmission line 14, a first drain transmission line 112 and a second drain transmission line 102. The sources of all the first thin film transistors 111 and the second thin film transistors 101 are coupled to the source transmission line 13, and the gates of all the first thin film transistors 111 and the second thin film transistors 101 are coupled to the gate transmission line 14. The drains of all the first thin film transistors 111 are coupled to the first drain transmission line 112, and the drains of all the second thin film transistors 101 are coupled to the second drain transmission line 102. Moreover, the source transmission line 13 is also coupled to the second pin corresponding to the brightness control device M, so that the detection pulse signal output by the brightness control device M can be input to the sources of each first thin film transistor 111 and second thin film transistor 101 through the source transmission line 13. The gate transmission line 14 is also coupled to the corresponding first pin of the brightness control device M, so that the adjustment control signal output by the brightness control device M can be input to the gates of each first thin film transistor 111 and second thin film transistor 101 through the gate transmission line 14. The first drain transmission line 112 is also coupled to the corresponding third pin of the brightness control device M, so that the brightness detection signal output by the first thin film transistor 111 can be input to the brightness control device M through the first drain transmission line 112, to cause the brightness control device M to detect the brightness detection signal. The second drain transmission line 102 is also coupled to the corresponding sixth pin corresponding to the brightness control device M, so that the reference signal output by the second thin film transistor 101 can be input to the brightness control device M through the second drain transmission line 102, to cause the brightness control device M to detect the reference signal.

For example, as shown in FIG. 1, the peripheral area BB where the brightness detection module 11 and the reference module 10 are located may be located on the same side of the display area AA. By locating the brightness detection module 11 and the reference module 10 on the same side of the display area AA, it is ensured that the working environment of the brightness detection module 11 and the reference module 10 on the display panel is roughly the same, and the effect of differences in the working environment on the detection of the brightness detection module 11 and the reference module 10 can be excluded, thereby favorably improving the detection accuracy of the brightness detection module 11 and the reference module 10.

For example, as shown in FIGS. 1 and 2, the source transmission line 13 and the gate transmission line 14 may be disposed on one side of the display panel, and the first drain transmission line 112 and the second drain transmission line 102 may be disposed on the other side of the display panel. Alternatively, the source transmission line 13, the gate transmission line 14, the first drain transmission line 112 and the second drain transmission line 102 can be disposed on the same side of the display panel, which is not limited here.

For example, as shown in FIGS. 1 and 2, the source transmission line 13 and the gate transmission line 14 may be disposed on a side away from the display area of a clock signal line that inputs a clock signal to a gate driving circuit in the display panel.

For example, as shown in FIGS. 1 and 2, the first drain transmission line 112 and the second drain transmission line 102 may also be disposed on a side away from the display area of a clock signal line that inputs a clock signal to a gate driving circuit in the display panel.

For example, the source transmission line 13, the gate transmission line 14, the first drain transmission line 112 and the second drain transmission line 102 can be connected to the brightness control device M through a flexible printed circuit, FPC, or alternatively, directly connected to the brightness control device M on the display panel through wiring avoidance or drilling.

For example, the brightness control device M may be configured as a touch and display driver integration, TDDI chip. Those skilled in the art will appreciate that embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product embodied on one or more computer-usable storage media (including, but not limited to, disk storage, CD-ROM, optical storage, etc.) having computer-usable program codes embodied therein.

The present disclosure is described with reference to flowchart illustrations and/or block diagrams of methods, apparatus (systems), and computer program products according to embodiments of the present disclosure. It should be understood that each process and/or block in the flowchart illustrations and/or block diagrams, and combinations of processes and/or blocks in the flowchart illustrations and/or block diagrams, can be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device produce a device for realizing the functions specified in one process or multiple processes of the flowchart and/or one block or multiple blocks of the block diagram.

These computer program instructions may also be stored in a computer-readable memory that causes a computer or other programmable data processing apparatus to operate in a particular manner, such that the instructions stored in the computer-readable memory produce an article of manufacture including the instruction means, the instruction means implements the functions specified in a process or processes of the flowchart and/or a block or blocks of the block diagram.

These computer program instructions may also be loaded onto a computer or other programmable data processing device, causing a series of operating steps to be performed on the computer or other programmable device to produce computer-implemented processing, such that the instructions executed on the computer or other programmable device provide steps for implementing the functions specified in process or processes of a flowchart diagram and/or a block or blocks of a block diagram.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the present disclosure.

Obviously, those skilled in the art can make various changes and modifications to the embodiments of the present disclosure without departing from the spirit and scope of the embodiments of the present disclosure. In this way, if these modifications and variations of the embodiments of the present disclosure fall within the scope of the claims of the present disclosure and equivalent technologies, the present disclosure is also intended to include these modifications and variations.

What is claimed is:

1. A brightness control method for a display panel, wherein the display panel comprises: a brightness detection module and a reference module, the brightness detection module comprises a plurality of first thin film transistors connected in parallel and the plurality of first thin film transistors are configured to receive ambient light; the reference module comprises a plurality of second thin film transistors connected in parallel and the plurality of second thin film transistors are configured to be in a dark environment; and the brightness control method comprises:

loading a detection pulse signal respectively to sources of the plurality of first thin film transistors of the brightness detection module and sources of the plurality of second thin film transistors of the reference module in the display panel, and loading an adjustment control signal to gates of the plurality of first thin film transistors and gates of the plurality of second thin film transistors; wherein the adjustment control signal is a fixed voltage signal, and a range of a voltage difference between the adjustment control signal and drains of the plurality of second thin film transistors is −2V~2V, and a voltage range of an effective level of the detection pulse signal is 3V~14V;

detecting a brightness detection signal output by the brightness detection module and detecting a reference signal output by the reference module; and adjusting brightness of the display panel through the brightness detection signal and the reference signal;

wherein a frequency of the detection pulse signal is less than a frequency of the ambient light, and a duration of the effective level of the detection pulse signal is not less than a duration of one cycle of the ambient light.

2. The brightness control method for the display panel according to claim 1, wherein the duration of the effective level of the detection pulse signal is an integer multiple of the duration of one cycle of the ambient light.

3. The brightness control method for the display panel according to claim 2, wherein the frequency of the ambient light is one of 50 Hz and 60 Hz; and the frequency of the detection pulse signal is one of 10 Hz, 5 Hz, 2 Hz and 1 Hz.

4. The brightness control method for the display panel according to claim 3, wherein the frequency of the ambient light is 60 Hz, and the frequency of the detection pulse signal is 10 Hz; and a duty cycle of the detection pulse signal ranges from 16.6% to 66.6%.

5. The brightness control method for the display panel according to claim 4, wherein the duty cycle of the detection pulse signal is one of 16.6%, 33.3%, 50% and 66.6%.

6. The brightness control method for the display panel according to claim 3, wherein the frequency of the ambient light is 50 Hz, and the frequency of the detection pulse signal is 10 Hz; and a duty cycle of the detection pulse signal ranges from 20% to 80%.

7. The brightness control method for the display panel according to claim 6, wherein the duty cycle of the detection pulse signal is one of 20%, 40%, 60% and 80%.

8. The brightness control method for the display panel according to claim 1, wherein the fixed voltage of the adjustment control signal loaded on the gates of the plurality of first thin film transistors is 0 V; and a voltage of the adjustment control signal loaded on the gates of the plurality of second thin film transistors is 0 V.

9. The brightness control method for the display panel according to claim 8, wherein the gates of the plurality of first thin film transistors and the gates of the plurality of second thin film transistors are coupled to a ground terminal.

10. The brightness control method for the display panel according to claim 1, wherein detecting the brightness detection signal output by the brightness detection module and detecting the reference signal output by the reference module, comprises:

within a maintenance duration of the effective level of the detection pulse signal, detecting the brightness detection signal output by the brightness detection module multiple times and detecting the reference signal output by the reference module multiple times.

11. The brightness control method for the display panel according to claim 10, wherein adjusting the brightness of the display panel through the brightness detection signal and the reference signal, comprises:

determining a detection voltage average value of the brightness detection signal obtained by detecting multiple times, and determining a reference average value of the reference signal obtained by detecting multiple times; and adjusting the brightness of the display panel according to a difference between the detection voltage average value of the brightness detection signal and the reference average value of the reference signal.

12. A brightness control device for a display panel, wherein the display panel comprises: a brightness detection module and a reference module, the brightness detection module comprises a plurality of first thin film transistors connected in parallel and the plurality of first thin film transistors are configured to receive ambient light; the reference module comprises a plurality of second thin film transistors connected in parallel and the plurality of second thin film transistors are configured to be in a dark environment; and the brightness control device comprises:

a signal loading circuit configured to respectively load a detection pulse signal to sources of the plurality of first thin film transistors of the brightness detection module and sources of the plurality of second thin film transistors of the reference module in the display panel, and load an adjustment control signal to gates of the plurality of first thin film transistors and gates of the plurality of second thin film transistors; wherein the adjustment control signal is a fixed voltage signal, and a range of a voltage difference between the adjustment control signal and drains of the plurality of second thin film transistors is −2V~2V, and a voltage range of an effective level of the detection pulse signal is 3V~14V;

a signal detection circuit configured to detect a brightness detection signal output by the brightness detection module and detect a reference signal output by the reference module within a maintenance duration of an effective level of the detection pulse signal; and a brightness adjustment circuit configured to adjust brightness of the display panel through the brightness detection signal and the reference signal;

wherein a frequency of the detection pulse signal is less than a frequency of the ambient light, and a duration of the effective level of the detection pulse signal is not less than a duration of one cycle of the ambient light.

13. A display device, comprising: a display panel and the brightness control device according to claim 12.

14. The display device according to claim 13, wherein the brightness control device comprises a first pin, a second pin, a third pin, a fourth pin, a fifth pin and a sixth pin;

the gates of the plurality of first thin film transistors are coupled to the first pin of the brightness control device, the sources of the plurality of first thin film transistors are coupled to the second pin of the brightness control device, drains of the plurality of first thin film transistors are coupled to the third pin of the brightness control device;

the gates of the plurality of second thin film transistors are coupled to the fourth pin of the brightness control device, the sources of the plurality of second thin film transistors are coupled to the fifth pin of the brightness control device, and the drains of the plurality of second thin film transistors are coupled to the sixth pin of the brightness control device.

15. The display device according to claim 14, wherein the brightness control device further comprises a first divider resistance and a second divider resistance;

a first end of the first divider resistance is coupled to the third pin, and a second end of the first divider resistance is coupled to a ground terminal;

a first end of the second divider resistance is coupled to the sixth pin, and a second end of the second divider resistance is coupled to the ground terminal.

16. The display device according to claim 15, wherein the gates of the plurality of first thin film transistors are coupled to the ground terminal; and the gates of the plurality of second thin film transistors are coupled to the ground terminal.

17. The display device according to claim 16, wherein the first pin and the fourth pin are the same pin, and the second pin and the fifth pin are the same pin.

18. The display device according to claim 13, wherein the display panel further comprises a black matrix;

positions of the plurality of first thin film transistors correspond to openings of the black matrix; and the plurality of second thin film transistors are blocked by the black matrix.

* * * * *